United States Patent [19]

Sakakura

[11] Patent Number: 4,967,239

[45] Date of Patent: Oct. 30, 1990

[54] PRINTER HAVING A REVERSIBLE MOTOR AND SEPARATE TRANSMISSIONS SYSTEMS

[75] Inventor: Sigeki Sakakura, Tokyo, Japan

[73] Assignee: Fujitsu Limited, Kawasaki, Japan

[21] Appl. No.: 467,357

[22] Filed: Jan. 23, 1990

Related U.S. Application Data

[63] Continuation of Ser. No. 250,173, Sep. 28, 1988, abandoned.

[30] Foreign Application Priority Data

Sep. 30, 1987 [JP] Japan ............................... 62-246716

[51] Int. Cl.[5] ............................................ C03G 15/00

[52] U.S. Cl. .................................... 355/309; 355/211

[58] Field of Search ............... 355/200, 202, 309, 311, 355/317, 210, 211; 346/153.1, 160, 160.1; 358/296; 271/3, 3.1, 8.1, 9

[56] References Cited

U.S. PATENT DOCUMENTS 4,652,161 3/1987 Crean et al. ......................... 400/625
4,727,387 2/1988 Israely ............................ 355/309 X
4,754,293 6/1988 Aizawa et al. ................. 355/309 X
4,769,669 9/1988 Watanabe ........................... 355/200
4,789,259 12/1988 Katayanagi ..................... 355/309 X
4,806,968 2/1989 Watanabe et al. .................. 355/200

*Primary Examiner*—Joan H. Pendegrass
*Attorney, Agent, or Firm*—Staas & Halsey

[57] ABSTRACT

An electrostatic printer includes a photoconductive drum (2), a developer (5) for forming a toner image on a surface of the drum (2), a pickup roller (11) for removing a medium (10) in a cut sheet form from a hopper (8), a registration roller (12) for introducing the cut sheets (10) removed by the pickup roller (11) into a printing zone, a fuser (14) for fixing the toner image on the cut sheets (10), and an eject roller (16) for discharging the medium (10) from the printing zone. A single motor (19) is selectively rotatable in the normal direction and the reverse direction according to commands output by a control unit (300) is provided for driving the aforesaid rotating elements (2, 5, 11, 12, 14, 16). A torque derived from the motor being transmitted, on one hand, to the pickup roller (11) through a first transmission system (100) incorporating a one-way clutch (20*a*) which transmits only one directional rotation of the motor, and on the other hand, to the rotating elements (12, 14, 16) other than pickup roller (11) through a second transmission system (200) incorporating another one-way clutch (20*b*) which transmits only the opposite directional rotation of the motor (19).

10 Claims, 18 Drawing Sheets

(PROCESS CARTRIDGE REMOVED)

PRINTER HAVING A REVERSIBLE MOTOR AND SEPARATE TRANSMISSIONS SYSTEMS

This is a continuation of copending application(s) Ser. No. 07/250,173 filed on Sept. 28, 1988 now abandoned.

BACKGROUND OF THE INVENTION

1. Field of the Invention

The present invention relates to a novel structure of an image forming apparatus such as an electrostatic printer or a copying apparatus.

2. Description of the Related Art

In general, an electrostatic printer includes a photoconductive drum around which a series of elements are arranged for forming a latent image on the surface of the drum, developing a toner image from the latent image, and transferring the toner image to a medium. These elements include a precharger, a latent image former, a developer, a transfer charger, a discharger and a cleaner. A hopper is provided for accommodating a medium to be printed in a cut sheet form. A series of rollers are provided for conveying the medium through the printer, including a pickup roller for removing the cut sheets one by one from the hopper, a registration roller for introducing the cut sheets into the image-transferring zone, a guide roller for guiding the cut sheets in synchronism with the rotation of the photoconductive drum during the image transferring operation, a heat roller for fixing the toner image on the cut sheets, and an eject roller for discharging the cut sheets from the printer.

The conventional electrostatic printer having such a structure has the driving system shown diagrammatically shown in FIG. 24. Namely, each of the rotating elements, i.e., the photoconductive drum and roller, is provided with a magnetic clutch for selectively connecting each element with a drive source (an electric motor). Thus, the respective rotating elements can be independently controlled. Magnetic clutches, however, are expensive, and the provision of same increases the cost of manufacturing the printer. Morever, the size of the printer is necessarily increased.

Further, in the conventional printer, if a jam occurs during the printing operation, clearing the jam by manually rotating a roller is difficult because the roller is always connected to a motor through a gear train.

SUMMARY OF THE INVENTION

An object of the present invention is to provide a compact size printer at a reduced manufacturing cost.

Another object of the present invention is to provide a printer having a structure, which facilitate easy clearing of jams.

According to the present invention, an image forming apparatus, such as an electrostatic printer, includes a rotating image carrier, such as a photoconductive drum, a developer for forming a toner image on a surface of the image carrier, a pickup roller for removing a medium in a cut sheet form from a hopper, a registration roller for introducing the cut sheets removed by the pickup roller into a printing zone, a fuser for fixing the toner image on the cut sheets, and an eject roller for discharging the cut sheets from the printing zone. The printer according to the present invention further includes a single motor selectively rotatable in the normal direction and the reverse direction in accordance with commands output from a control unit which is provided for driving the rotating elements; a torque derived from the motor being transmitted, on one hand, to the pickup roller through a first transmission system incorporating a one-way clutch, which transmits only one directional rotation of the motor, and on the other hand torque is transmitted to the rotating elements other than pickup roller through a second transmission system incorporating another one-way clutch which transmits only the opposite directional rotation of the motor.

At an initial stage of the operation, the motor rotates in one direction (normal rotation) and the pickup roller is driven through the first transmission system to remove the cut sheets from the hopper. Thereafter, the motor rotates in the reverse direction and the other rotating elements are driven through the second transmission system to convey the cut sheets through the printing zone while forming and fixing a toner image on the cut sheets. Therefore, when a cut sheet is in the image-transfer zone, the removal of the next cut sheet from a hopper is absolutely inhibited. In addition, the structure of the transmission system can be simplified, resulting in a compact and low cost printer.

According to a preferred embodiment of the present invention, an electrostatic printer is provided in which housing accommodating the elements of the printer is a clam type, comprising a lower cover unit and an upper frame unit hinged to the former at the rear end thereof so that the units are detachably connected to each other. Motor, the rotating image carrier, the developer, and a gear box constituting a part of the transmission system are provided in the lower cover unit. The rollers for transporting the cut sheets are provided in the upper frame unit, so that when the units are detached from each other, a gear train constituting a downstream part of the transmission system is completely separated from the gear box. Therefore, when a jam occurs, the upper frame unit can be detached from the lower cover unit, and the roller then easily rotated by hand to clear the jam.

Preferably, the printer is provided with a plurality of hoppers, each provided with a pickup roller and connected to the transmission system through a magnetic clutch in such a manner that any one of these can be selectively driven by the transmission system.

Advantageously, the rotating image carrier is integrally incorporated in a process cartridge with the developer, and the fuser is integrally incorporated in a fuser unit with a cooling fan and the eject roller, and thus, maintenance of the printer is greatly simplified.

These objects and other advantages of the present invention will be more apparent from the following description with reference to the drawings illustrating the preferred embodiments of the present invention.

BRIEF DESCRIPTION OF THE DRAWINGS

FIG. 15(*b*) is a partial enlarged back view of the mechanism of FIG. 15(*a*);

FIG. 17(*b*) is a side view of the gear mechanism of FIG. 19(*a*);

DETAILED DESCRIPTION OF THE PREFERRED EMBODIMENTS

Figure 1:
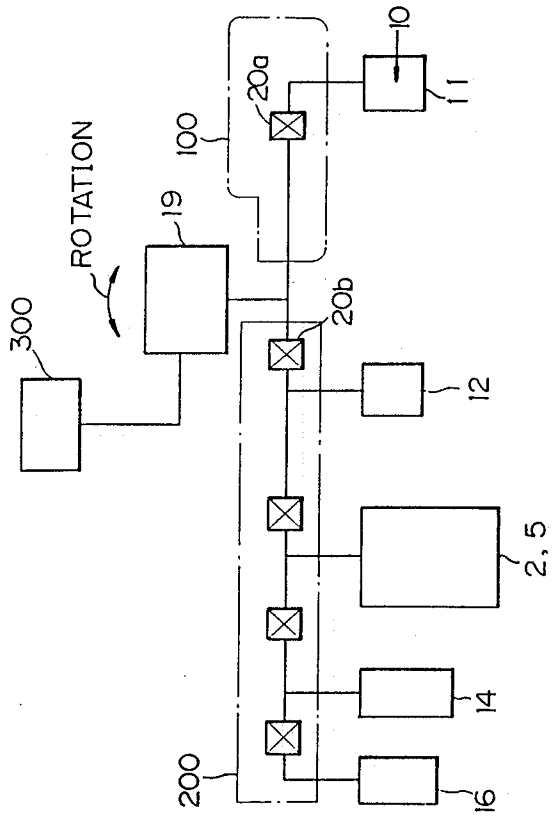
FIG. 1 is a block diagram illustrating a principle of the present invention.
Figure 2:
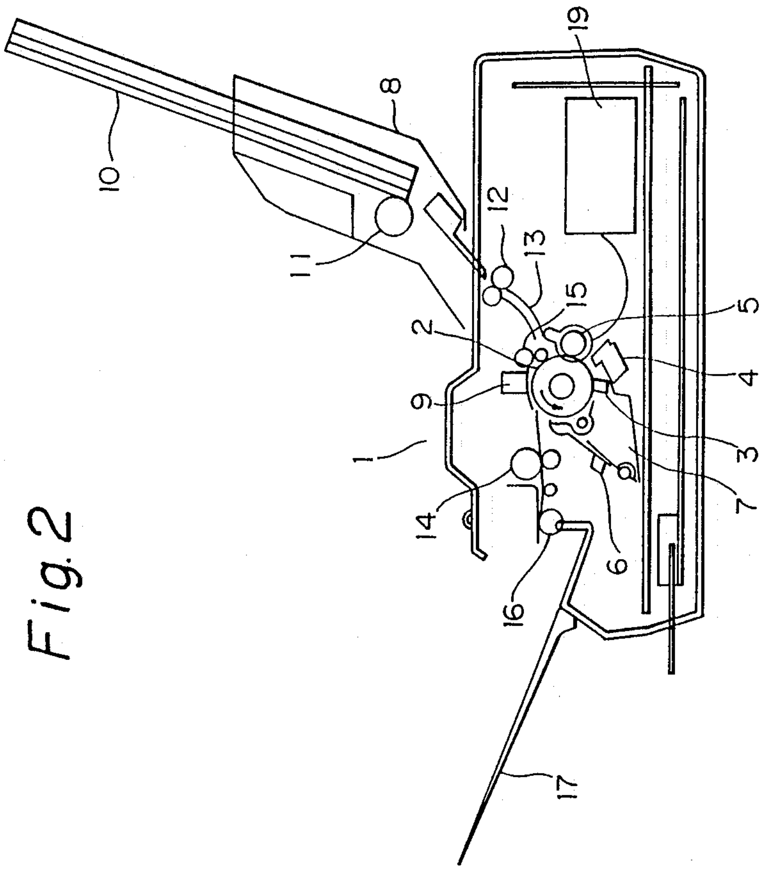
FIG. 2 is a schematic side elevational view illustrating a printer according to a first preferred embodiment of the present invention.

FIG. 2 illustrates a printer according to a first embodiment of the present invention. The printer 1 is provided with a photoconductive drum 2 and a series of image-forming elements including a precharger 3, latent image-forming means 4, such as an LED array, a developer 5, a transfer-charger 9, a discharger 6, and a cleaner 7 arranged around the surface of the drum 2. Also, a fuser 14 is disposed on the left of the transfer-charger 9 in FIG. 2.

A medium 10 in cut sheet form is accommodated in a hopper 8 and removed therefrom one by one by the rotation of a pickup roller 11 pressing against the cut sheets 10, and sent toward a registration roller 12. The medium cut sheets 10 are then kept in a standby position while in contact with the registration roller 12, until a command to commence printing operation is output from a control unit (not shown). Upon receiving the commence printing command, the photoconductive drum 2 is made to rotate in the arrowed direction, and the cut sheets 10 delivered from the registration roller 12 through a path 13 are introduced into an operational area of the transfer-charger 9 by a guide roller 15, in synchronism with the rotation of the drum 2.

The formation of a toner image on the surface of the photoconductive drum 2, and the transfer of that image, are carried out in the following manner:

The photoconductive drum 2 is uniformly charged by the precharger 3. Then, a static latent image is formed by the LED array 4, which is developed by the developer 5 and transferred onto a cut sheet 10 by the transfer-charger 9. Next, the cut sheet 10 is conveyed to the left in FIG. 2 toward the fuser 14, in which the toner image is fixed on the cut sheet 10. Finally, the cut sheet 10 is discharged onto a stacker 17 by an eject roller 16.

After the toner image has been transferred from the drum 2 to the cut sheet 10, the charge on the surface of the photoconductive drum 2 is removed by the discharger 6 and residual toner powder is withdrawn by the cleaner 7.

Figure 3:
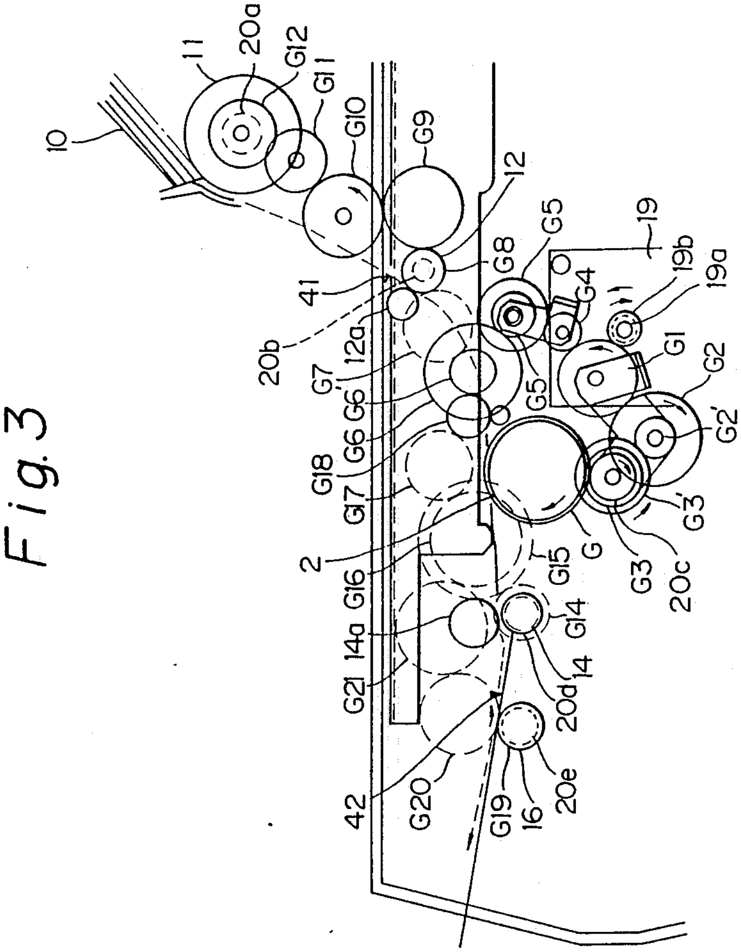
FIG. 3 is a side elevational view of a major portion of a transmission system for printer shown in FIG. 2.

Next, a transmission system for the perspective rotating elements in the printer 1 will be described below with reference to FIGS. 3 and 4.

A reversible motor 19 is provided in the printer 1 as a common drive source for the respective rotating elements, and is selectively rotatable in a normal direction and a reverse direction in accordance with a command output by the control unit.

Figures 4A, 4B, 4C:
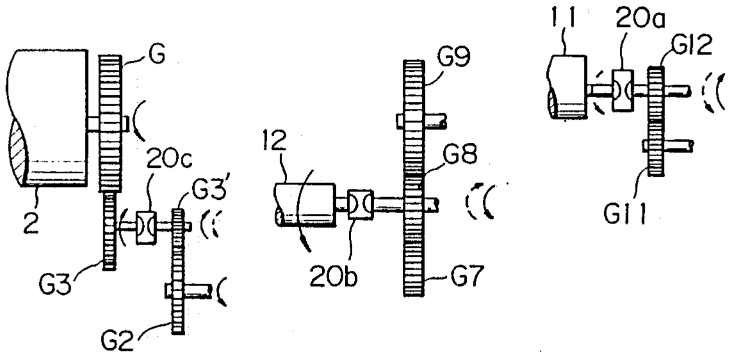
FIGS. 4(*a*) through 4(*c*) are partial views of the transmission system of FIG. 3, respectively.

As shown FIG. 4(*a*), the pickup roller 11 has a gear G12 at one end portion of a shaft 11*a* thereof and a one-way clutch 20*a* of a conventional type, which transmits torque derived from the motor 19 to the shaft 11*a* only when the gear G12 rotates in the direction shown by the dotted directional arrow and shuts off torque when rotated in the direction shown by a solid direction arrow. FIG. 4(*b*) and 4(*c*) are views similar to FIG. 4(*a*), of the registration roller 12 and the photoconductive drum 2, respectively.

Torque from the motor 19 is transmitted to the one-way clutch 20*a* via a gear train G12, G11, G10, G9, G8, G7, G6', G6, G5', G5, G4, G1, and 19*b*.

The registration roller 12, which nips the cut sheet 10 delivered by the pickup roller 11, in cooperation with a pinch roller 12*a*, has a gear G8 at one end of a shaft 12*b* thereof, and another one-way clutch 20*b*, which transmits torque derived from the motor 19 to the shaft 12*b* only when the gear G8 rotates in the direction shown by a solid directional arrow and inhibits torque transmission when the gear G8 rotates in the reverse direction as shown by a dotted directional arrow. The latter rotation of the gear G8 corresponds to counterclockwise rotation of the motor 19, by which the pickup roller 11 is operated.

The photoconductive drum 2 is driven by a gear G secured to a shaft 2*a*. The gear G, in turn, is driven by the motor 19 through a gear train which includes gear G3, a third one-way clutch 20*c*, and gears G3', G2', G2 and G1. A sleeve and an agitator (not shown) in the developer 5 are also driven by a branch of this gear train. The one-way clutch 20*c* is adapted to transmit torque only when the motor 19 is made to rotate clockwise.

A heat roller 14 in the fuser which nips, in association with a backup roller 14*a*, the cut sheet 10 for fixing a toner image on the cut sheet, has a gear G14 at one end of a shaft thereof and a one-way clutch **20*d*. The gear G14 is operatively connected to a gear 66'** via a gear train G15, G16, G17, G18.

The eject roller 16 has a gear G19 at one end of a shaft thereof and a one-way clutch **20*e*.** The gear B19 is operatively connected to a gear G16 through a gear train including gears G20 and G21.

The one-way clutches **20*d* and 20*e* are adapted to transmit torque to the associated shafts only when the motor 19** is rotated clockwise.

An entry sensor 41 is provided for detecting the arrival of the cut sheet 10 at the standby position in front of the registration roller 12, and an exit sensor 42 is provided for detecting the discharger of the cut sheet 10 from the printing zone by the eject roller 16.

Figure 5:
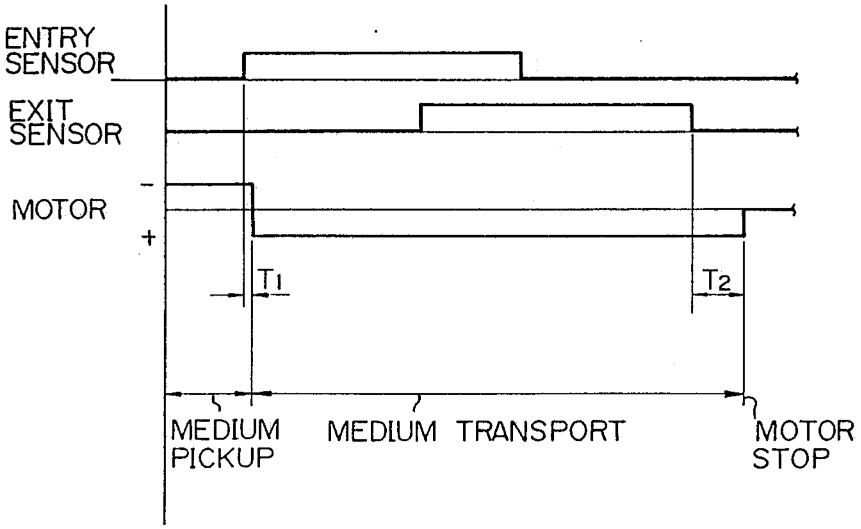
FIG. 5 is a time chart for controlling the rotation of rotating elements of the printer according to the first preferred embodiment.

FIG. 5 shows a time chart for transporting the cut sheets 10. When one cut sheet 10 in the hopper 8 is removed by the rotation of the pickup roller 11 caused by the rotation of the motor 19 in the normal direction and reaches the registration roller 12, this arrival is detected by the entry sensor 41. After time period T1 from detection of the arrival of the cut sheet 10, the motor 19 is made to rotate in the reverse direction by a command output by a control unit. Thus, a printing operation is carried out on cut sheet 10. When the exit sensor 42 detects the discharge of the cut sheet 10, the motor 19 is made to stop after a period T2 from the detection of the discharge of the cut sheet 10 and waits for a command to commence the next cycle. The periods T1 and T2 are necessary for enhancing the reliability of the operation.

With reference to FIGS. 6 through 23, a second embodiment of the present invention will be described.

Since a printer according to this embodiment has a basic structure similar to that of the first embodiment described above, and the functions of the individual elements composing the printer are already known, the explanation which follows will be made only of the difference of the second embodiment from the first embodiment.

Figure 6:
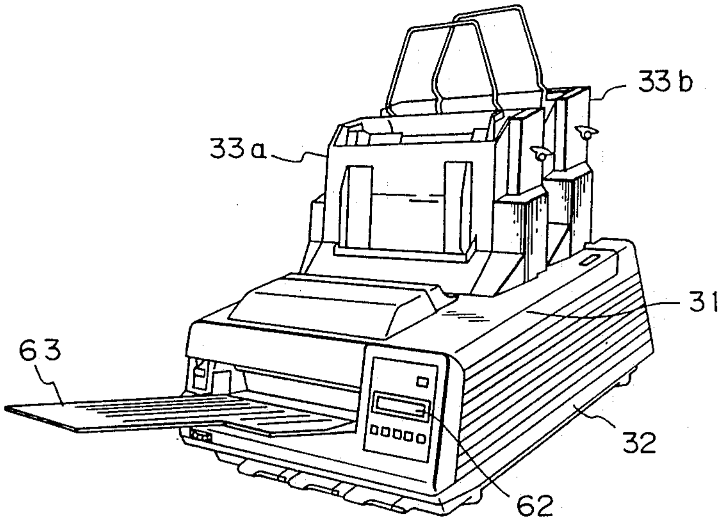
FIG. 6 is a perspective view of a printer according to a second preferred embodiment of the present invention.
Figure 7:
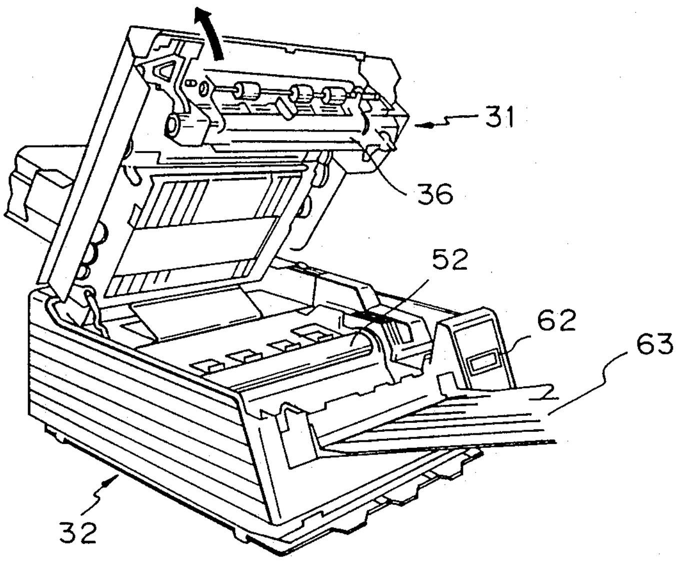
FIG. 7 is a perspective view of the printer of FIG. 6, wherein an upper frame unit is detached from the lower cover unit.

The printer of the second embodiment has the appearance as shown in FIG. 6, and comprises a clam type housing having an upper frame unit 31 and a lower cover unit 32 detachably connected to each other by a hinge, as shown in FIG. 7. In the drawings, reference numeral 62 designates a control panel for controlling the operation of the printer and 63 designates a stacker for receiving a printed medium (cut sheets).

Figure 8:
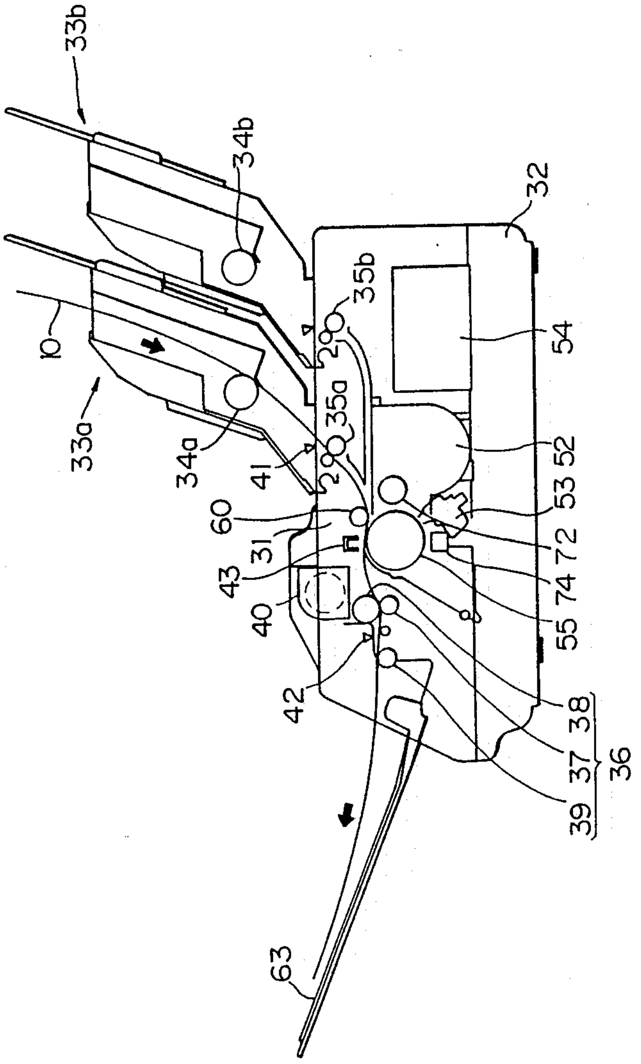
FIG. 8 is a side elevational view of the printer of FIGS. 6 and 7.
Figure 9:
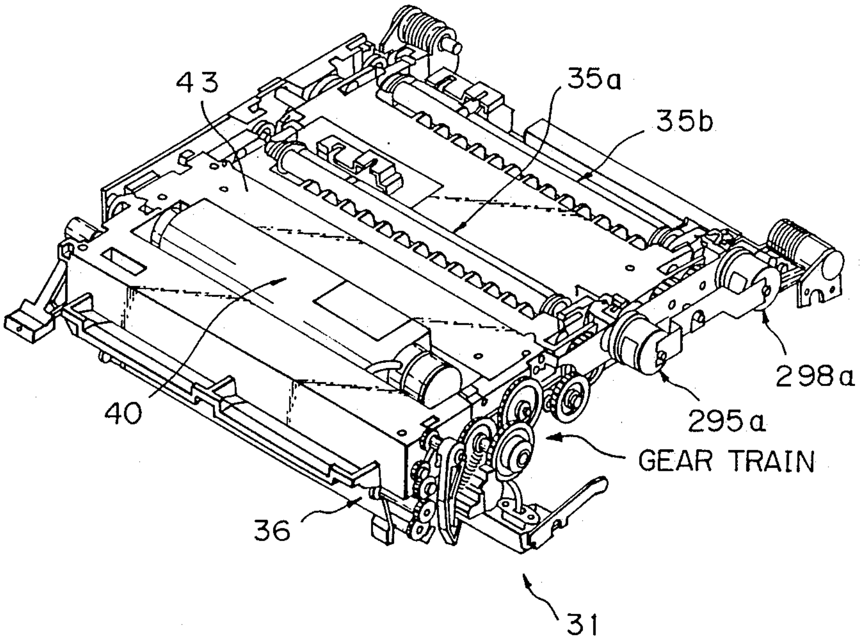
FIG. 9 is a perspective, view of the upper frame unit according to the present invention.
Figure 10:
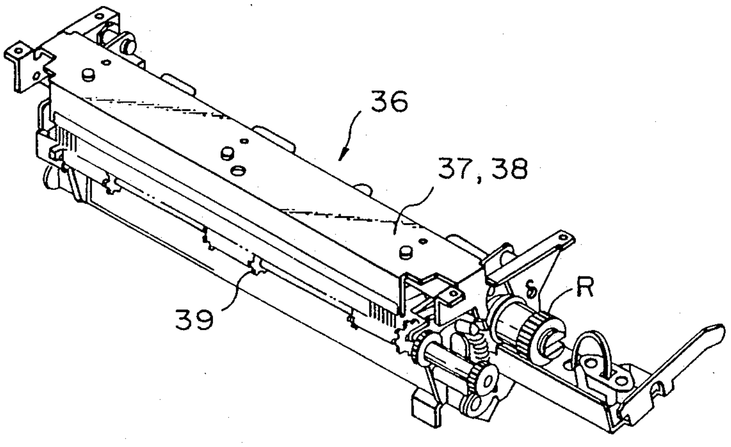
FIG. 10 is a perspective view of a fuser unit according to the present invention.

As apparent from FIGS. 8 and 9, the upper frame unit 31 has a fuser unit 36, a cooling fan 40, an entry sensor 41, an exit sensor 42 and a transfer-charger 43. In addition, first and second hoppers **33*a* and 33*b* are detachably secured to the upper frame unit 31. The hoppers 33*a* and 33*b* are provided, respectively, with pickup rollers 34*a*, 34*b*, which correspond, respectively, to registration rollers 35*a*, 35*b* secured to the upper frame unit 31. Different kinds of cut sheets 10 can be accommodated in these hoppers, respectively. During the printing operation, either one of the hoppers is selected by the action of magnetic clutches 295*a*, 298*a* as stated later. As shown in FIGS. 8 and 10, a heat roller 37, a backup roller 38, and an eject roller 39 are all incorporated into the fuser unit 36**.

As illustrated in FIGS. 7, 8 and 10, in the lower cover unit 32 are secured a process cartridge 52, and LED array 53, and a reversible motor 54 which is a drive source for the rotating elements of the printer.

Figure 11:
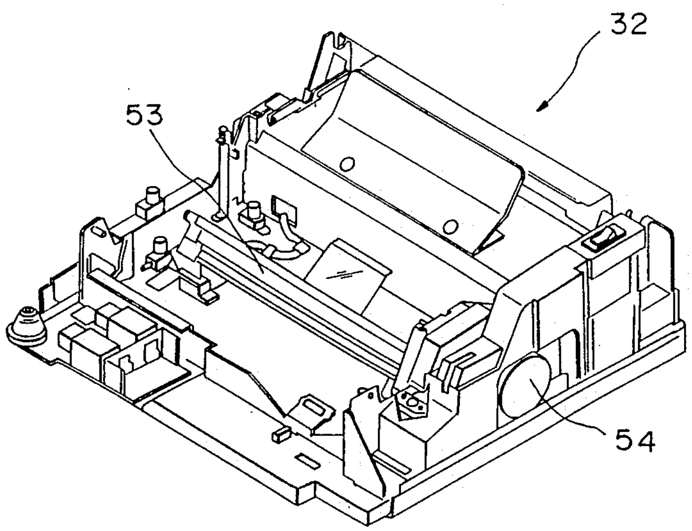
FIG. 11 is a perspective view of a lower cover unit.
Figure 12A:
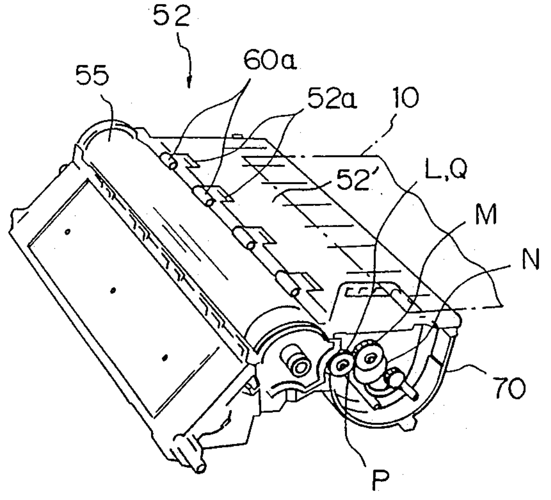
FIGS. 12(*a*) and 12(*b*) are perspective views of a process cartridge according to the present invention.
Figure 12B:
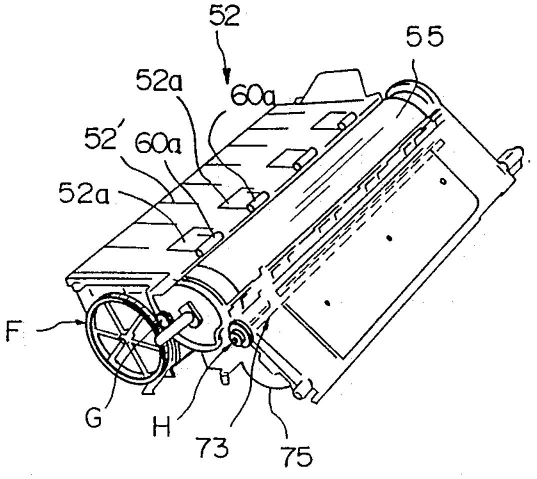
Figure 13:
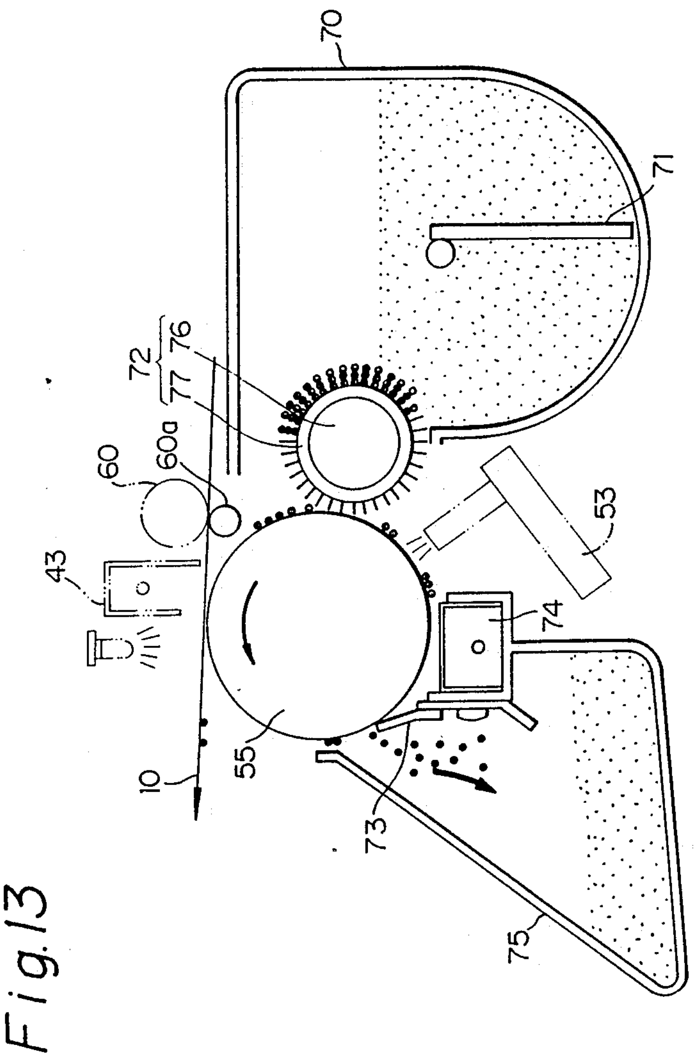
FIG. 13 is a schematic side elevational view illustrating, an internal structure of the process cartridge of FIGS. 12(*a*) and 12(*b*)

With reference to FIGS. 11, 12(*a*), 12(*b*), and 13, the process cartridge 52 is a composite body in which a developer consisting of a toner vessel 70, an agitator 71, and a developing roller 72; a precharger 74; a cleaning blade 73; a residual toner withdrawal vessel 75; and photoconductive drum 55 are integrally and compactly combined. The cartridge 52 is easily attached to and detached from the lower cover unit 32 by a push botton mechanism. In the developer, a toner powder in the vessel 70 is stirred by the agitator 71 and uniformly fed to the developing roller 72. The developing roller 72 consists of a magnetic roller 76 forming a core and sleeve 77 covered thereon. The magnetic roller 76 and the sleeve 77 rotate, respectively, at different speeds, so that the sleeve 77 can convey a toner powder onto the surface of the photoconductive drum 55 by a magnetic brush formed on the surface of the sleeve 77, which toner powder forms a toner image on the drum 55 corresponding to a latent image. The cleaning blade 73 is adapted to clean residual toner powder from the surface of the photoconductive drum 55 after the toner is transferred to the cut sheets 10. The precharger 74 is adapted to uniformly impart an electric charge to the surface of the photoconductive drum 55, to prepare for the next image forming cycle. An upper surface 52' of the process cartridge 52 constitutes a guide plate for the cut sheets 10. A pinch roller **60*a* is provided at a front edge of the upper surface 52' and biased upward by a blade spring 52*a* to be resiliently in contact with a guide roller 60 secured on the upper frame unit 31. A cut sheet 10 can be introduced into an image-transfer zone formed between the drum 55 and a transfer-charger 43, while nipped between the pinch roller 60*a* and the guide roller 60**.

Torque from the motor 54 is transmitted to the respective rotating elements in the lower cover unit 32 and the upper frame unit 31 through a gear box secured on one side of the lower cover unit.

Figure 14:
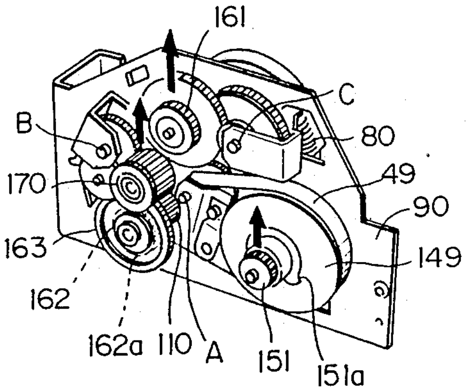
FIG. 14 is a perspective view of a gear box provided in the lower cover unit.

FIG. 14 shows the gear box with the cover removed therefrom, in which various gears and pulleys are secured on a bracket 90. The torque from the motor 54 is transmitted to a gear 162 from a motor gear 110. A gear 163 is coaxially secured with the gear 162, with the type, so that only the counter-clockwise rotation of the gear 162 can be transmitted to the gear 163. Also, a one-way clutch **151*a* of the same type as the clutch 161*a* is intervened between a pulley 149 and a gear 151 secured coaxially therewith, which transmits only the counter-clockwise rotation of the pulley 149 to the gear 151**.

In FIG. 14, the gear 151 is used for driving the photoconductive drum 55 in the process cartridge 52 and is biased about a shaft A in the arrowed direction by a spring (not shown). A gear 170 is used for driving a developing roller 72, and is biased about a shaft B in the direction of the arrow. Further, a gear 161 is used for transmitting torque to a gear train for driving the rollers secured in the upper frame unit 31 and is biased about a shaft C by a spring 80. These three gears 151, 170, and 161 are key wheels for outputting torque from the gear box.

Figure 15A:
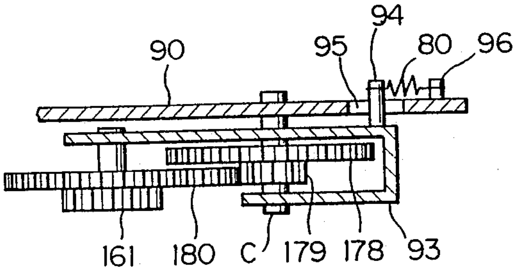
FIG. 15(*a*) is a plan view of a mechanism for ensuring an intermeshing of a gear in the gear box with a gear in the upper frame unit.
Figure 15B:
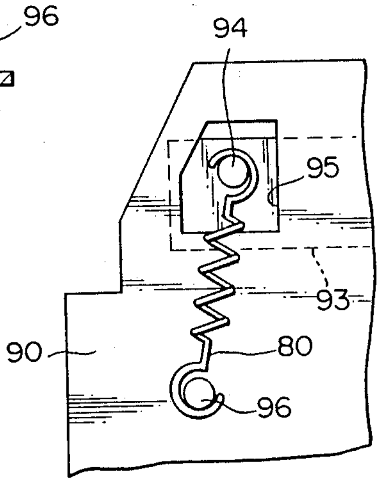

The above mechanism for biasing these gears is described in more detail with reference to FIGS. 15(*a*) and 15(*b*) in the case of the gear 161, as an example. Gears 161, 180 fixed coaxially with each other are rotatably secured at one end of a U-shaped member 93. The member 93, in turn, is rotatably secured at a middle portion thereof on the shaft C of a gear 179 intermeshed with the gear 180. The shaft C is rotatably secured on the bracket 90. At the other end of the member 93 opposite to the gear 91 is provided a pin 94, which extends backward through an aperture 95 of the bracket 90. The spring 80 (also see FIG. 15(*b*)) is hooked at one end thereof to the pin 94 and at the other end thereof to another pin 96 fixed on a lower portion of the bracket 93. According to this mechanism, the gear 161 is always resiliently biased in the arrowed direction in FIG. 14. Similar mechanisms are provided for the gears 151 and 170, and accordingly, these key wheels are firmly intermeshed with the corresponding external gear when the latter is meshed with the former.

Next, an operation of the gear box will be explained below.

Figure 16A:
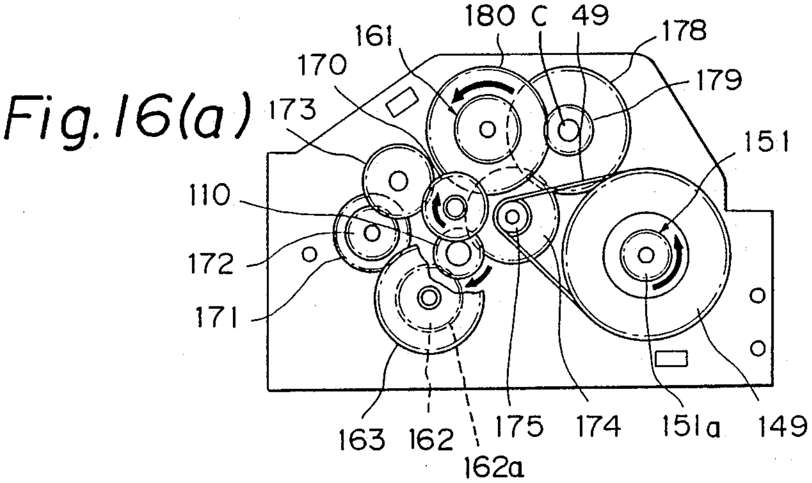
FIG. 16(*a*) and 16(*b*) are side views of the gear box, illustrating path of a torque transmission according to the rotational direction of a motor.
Figure 16B:
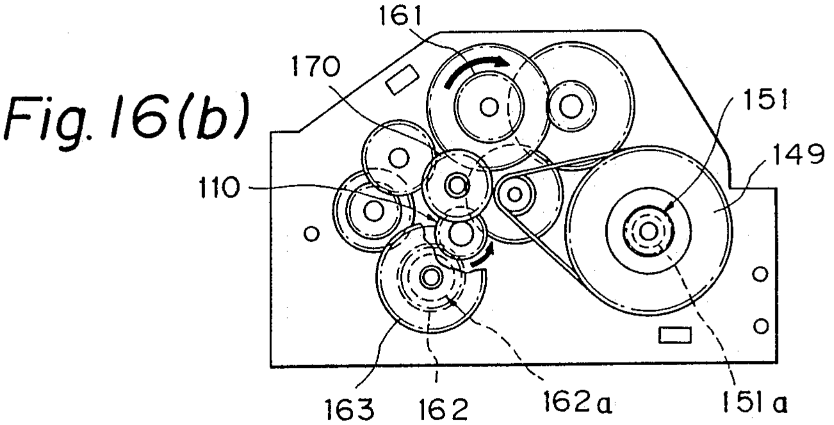

When the motor 54 rotates clockwise, as shown in FIG. 16(*a*), torque is transmitted by the motor gear 110, on one hand, to the gear 162, which then is driven counter-clockwise. Accordingly, this rotation is transmitted to the gear 163 by the one-way clutch 162*a*, and sequentially, through a gear train 171, 172, and 173, to the gear 170 which is then driven in the arrowed direction. On the other hand, the rotation of the motor gear 110 drives the gear 161 in the arrowed direction through a gear train 174, 178, 179, 180. Also, the rotation of the motor gear 110 drives the gear 151 in the arrowed direction through a path of the gear 174, a pulley 175, a belt 49, and the pulley 149. Note, a pulley/belt mechanism is used for driving the gear 151 so that the photoconductive drum can be smoothly rotated, resulting in a better printing quality.

When the motor 54 is rotated counter-clockwise, as shown in FIG. 16(*b*), the gear 162 is driven clockwise and the torque is not transmitted to the gear 163 by the one-way clutch 162*a*. Therefore, the gear 170 downstream from the gear 163 remains stationary. However, the rotation of the motor gear 110 is transmitted to the gear 161 through the gear train 174, 178, 179, 180 and drives the same in the arrowed direction (reverse to the case shown in FIG. 16(*a*)). On the other hand, although the pulley 149 is driven in the reverse direction (clockwise) through the aforesaid path, this rotation is not transmitted to the gear 151 which then still remains stationary, by the one-way clutch 151*a*. Accordingly, the rotating elements in the process cartridge 52 can be driven only when the motor is rotated clockwise, and are not driven when the motor is rotated counter-clockwise. A mechanism for driving the process cartridge 52 is explained in more detail with reference to FIGS. 12, 13 and 17.

Figure 17A:
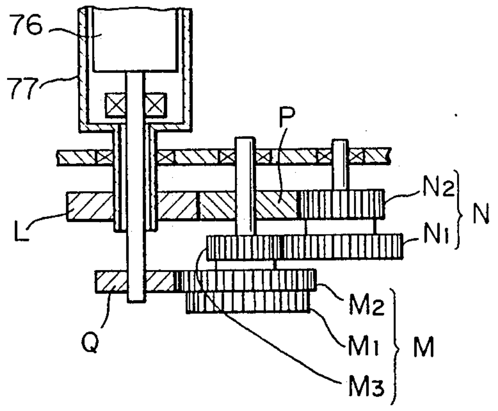
FIG. 17(*a*) is a plan view of a gear mechanism for driving rotating elements in the process cartridge.
Figure 17B:
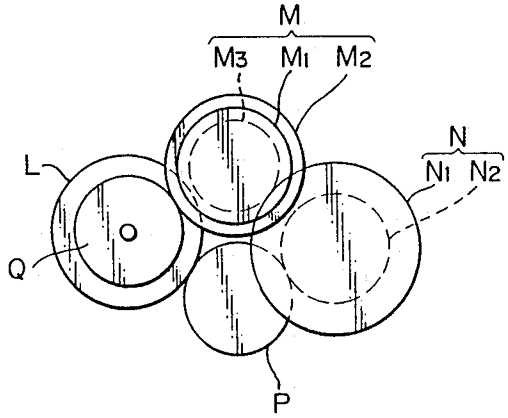

Details of gears L through Q for driving the process cartridge 52 are shown in FIGS. 17(*a*) and (*b*). These gears are also illustrated in FIG. 12(*a*) in a simplified manner. A gear L is fixedly secured at one end of the sleeve 77, and a gear Q is fixedly secured, at one end of the magnetic roller 76. A gear assembly M includes three gears M1, M2, M3 coaxially and integrally fixed with each other. A gear assembly N includes two gears N1 and N2 also coaxially and integrally fixed with each other. The gear M1 is intermeshed with the gear 170 in the gear box and transmits the rotation thereof through the gear M2 to the gear Q, which then drives the magnet roller 76. The rotation of the gear M2 is transmitted through a gear train M3, N1, N2, P to the gear L, which then drives the sleeve 77. The gears M, N, P are rotatably secured on a side wall of the process cartridge 52. With reference to FIG. 12(*b*), a gear G fixed at the opposite end of the magnetic roller 76 is intermeshed with a gear F fixed at one end of a shaft of the agitator 71, to drive the latter.

Next, a description will be given of a gear train arranged in the upper frame unit 31.

Figure 18:
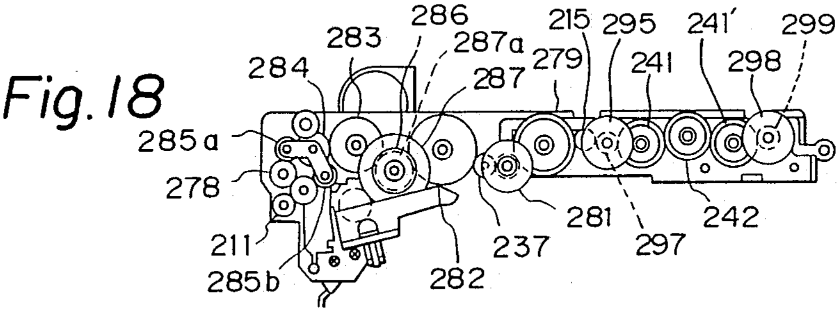
FIG. 18 is a side view of a gear train provided on one side of the upper frame unit.

With reference to FIG. 18, a gear 281 disposed at a center of the gear train is intermeshed with the gear 161 in the gear box of the lower cover unit 32.

First, in a path from the gear 161 to the left in FIG. 18, a torque is transmitted through a gear train 237, 282, 286 to a gear 287, which is intermeshed with a gear R (FIG. 10) fixed on a shaft of the heat roller 37 of the fuser, to drive the same. In this connection, the gears 286 and 287 are secured coaxially with a one-way clutch 287*a* intervened therebetween, which is adapted to transmit only the clockwise rotation of the gear 286 to the gear 287. Accordingly, the heat roller 37 can rotate only counter-clockwise, to forward the cut sheets 10.

Figure 19B:
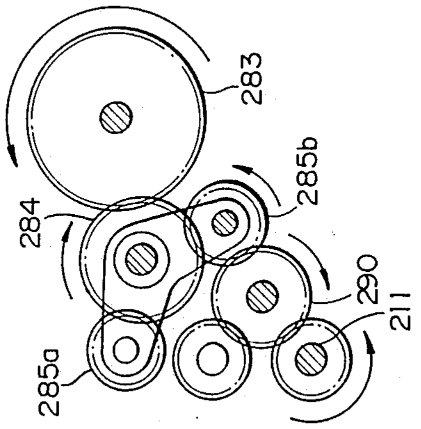
FIGS. 19(*a*) and 19(*b*) are enlarged views of part of the gear train of FIG. 18, illustrating a transmission path for driving an eject roller.
Figure 19A:
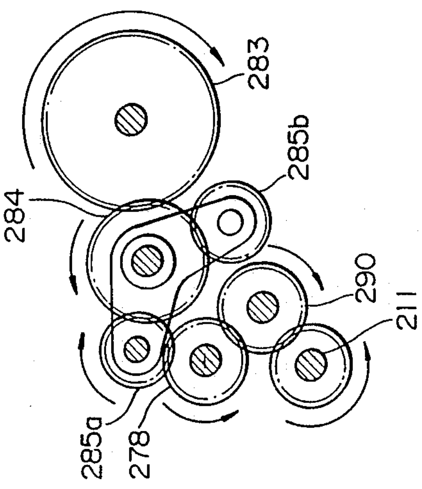

The gear 286 further transmits torque to a gear 211 for driving the eject roller 39 through a gear train 283 284, 285*a* or 285*b*, and 278. As shown on an enlarged scale in FIGS. 19(*a*) and 19(*b*), the gear 285*a* is secured at one end of an L-shaped lever 285 which, in turn, is pivoted about an axis X coaxially with the gear 284. At the other end of the lever 285 is secured a gear 285*b* having the same number of teeth as the gear 285*a*. As shown in FIG. 19(*b*), when the gear 283 is rotated clockwise, the gear 284 is driven counter-clockwise and the lever 285 is also pivoted in the same direction, whereby the gear 285*a* is intermeshed with the gear 278 while the other gear 285*b* is free. Consequently, the gear 211 is driven counter-clockwise as shown by an arrow, which corresponds to the running direction of the cut sheets 10. Conversely, as shown in FIG. 19(*b*), when the gear 283 is rotated counter-clockwise, the lever 285 is pivoted clockwise so that the gear 285*b* is intermeshed with the gear 290, whereby the gear 211 is still driven counter-clockwise, or the same direction as before. That is, the eject roller 39 is always made to rotate in one direction even though the rotation of the gear 281 is reversed.

The guide roller 60 is made to rotate by the gear 237.

Figure 20:
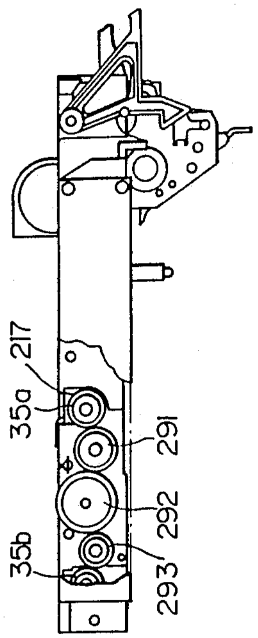
FIG. 20 is a side view of a gear train provided on the other side of the upper frame unit.
Figure 21:
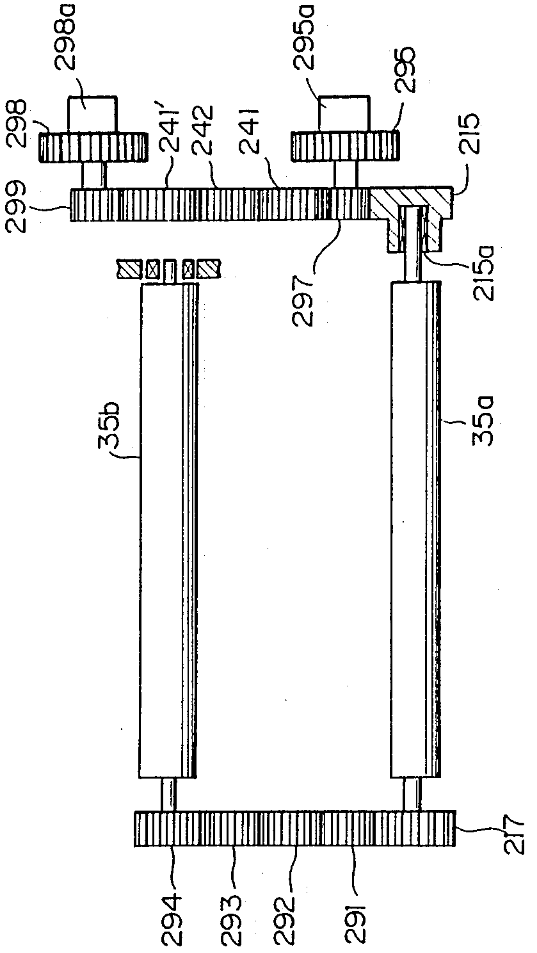
FIG. 21 is a plan view illustrating a gear train for driving a registration roller and a pickup roller.

Next, a transmission path to the right in the Figures will be explained with reference to FIGS. 18, 20, and 21. Torque from the motor is transmitted to a gear 215 secured at one end of a shaft of the registration roller 35*a* for the first hopper 33 via a one-way clutch 215*a*. The one-way clutch 215*a* is operative to prevent rotation of the gear 215 in the direction for driving the pickup roller 11 from being transmitted to the registration roller 35*a*, but to permit the transmission of the opposite rotation of the gear 215 to the registration roller 35*a* to transport the cut sheets 10. At the opposite end of the registration roller 35*a* is fixed a gear 217, which is operatively connected to a gear 294 fixed at one end of the registration roller 35*b* for the second hopper 33*b* via a gear train 291, 292 and 293. In this structure, both the registration rollers 35*a*, 35*b* are made to rotate simultaneously with each other. A press roller (not shown) for nipping the cut sheets in association with the registration roller 35*a*, 35*b* is provided adjacent to the respective registration rollers 35*a*, 35*b* and is made to rotate by the latter through a gear-engagement therewith.

Figure 22:
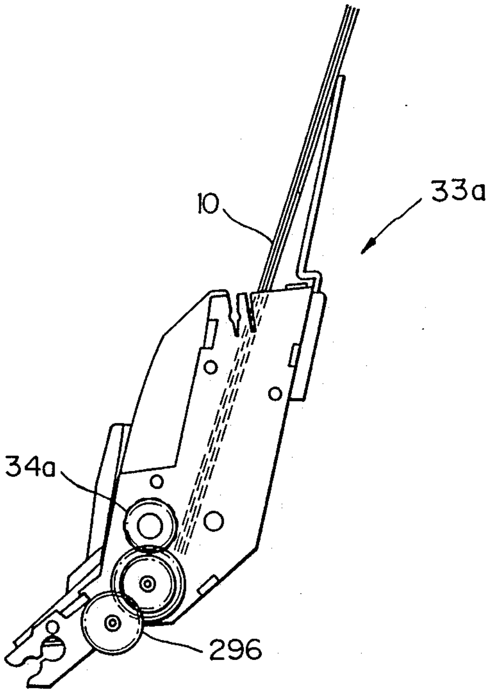
FIG. 22 is a side elevational view of a hopper illustrating a gear secured to and driving the pickup roller.

The gear 215 is also intermeshed with a gear 297 coaxially fixed with a gear 295 having a magnetic clutch 295*a* and is associated with a gear 299 coaxially fixed with a gear 298 having a magnetic clutch 298*a*. The gear 295 is provided for engagement with a hopper gear 296 in the first hopper 33*a,* as shown in FIG. 22, and transmits the rotation to the latter when the magnetic clutch 295*a* is actuated so that the pickup roller 34*a* is made to rotate. In a similar manner, the pickup roller 34*b* in the second hopper 33*b* is driven when the magnetic clutch 298*a* is actuated.

Figure 23A:
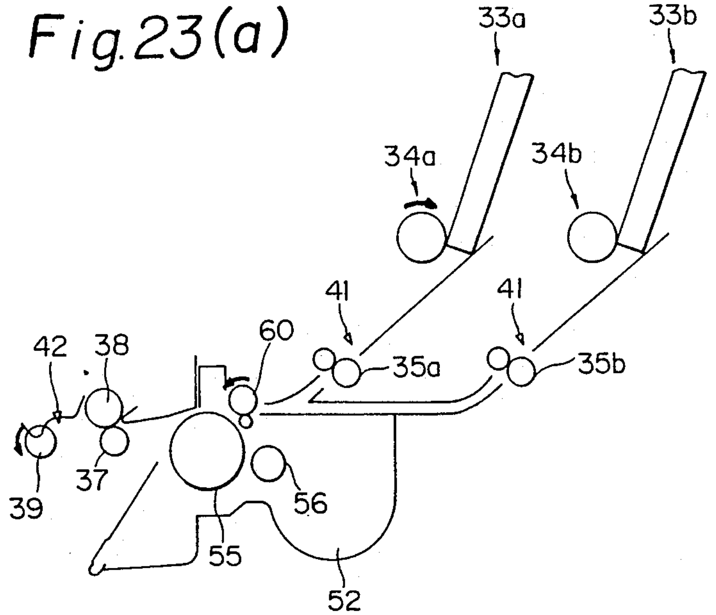
FIGS. 23(*a*) and 23(*b*) are schematic side views illustrating the rotational direction of the respective elements in the printer of the second embodiment in accordance with the rotation of the motor; and, FIG. 24 is a block diagram for controlling the rotation of the respective rotating elements in a conventional printer.
Figure 23B:
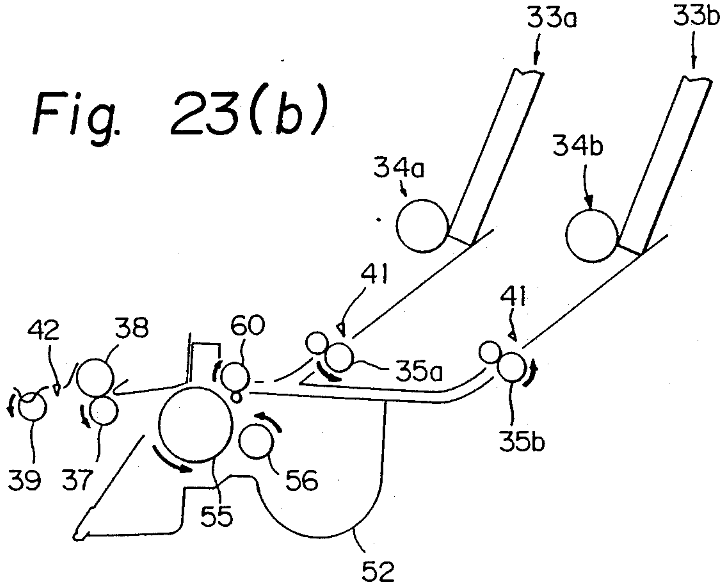
Figure 24:
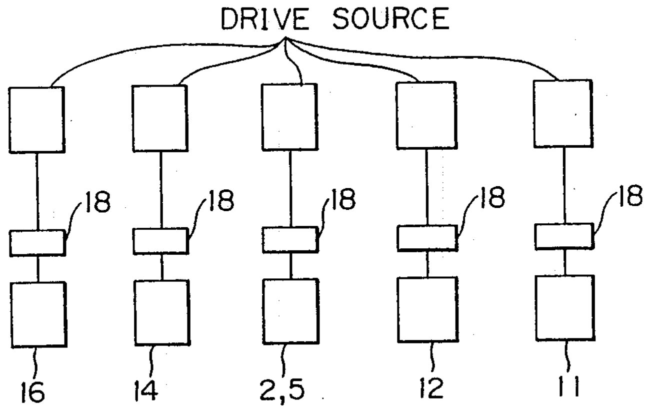
Fig.24 (Prior Art)

An operation of the printer of the second embodiment is as follows:

The operation is basically similar to that of the first embodiment, but since a plurality of hoppers are provided in the second embodiment, the selection of the hopper must be made first by actuating one of the magnetic clutches. If the hopper 33*a* is selected, the magnetic clutch 295*a* is actuated so that the transmission path to the hopper 33*a* is formed. Of course, the other magnetic clutch 298*a* is off. Then the motor 54 is made to rotate in the direction whereby the pickup roller 34*a* is driven to move the cut sheets 10 forwardly, as shown in FIG. 23(*a*). When the front edge of the cut sheet 10 is detected by the entry sensor 41, the magnet clutch 295*a* is switched off and then the motor 54 is stopped. When the next command is output, the motor 54 is rotated in the opposite direction, whereby the rotating elements in the printer other than pickup rollers 34*a,* 34*b* are driven in the arrowed direction in FIG. 23(*b*). The cut sheet 10 passes the upper surface of the photoconductive drum 55, and when the rear edge of the cut sheet 10 is detected by the exit sensor 42, the motor is stopped and waits for the command to commence the next printing.

In this connection, although the guide roller 60 rotates with the pickup roller 33 in the reverse direction to the normal operation, as shown in FIG. 23(*a*), this causes no trouble because no cut sheets are present in the operation zone of the guide roller 60 at this stage. Further, when the registration roller corresponding to the selected hopper is driven, the other registration roller is rotated therewith, as shown in FIG. 23(*b*), which also causes no problem because the cut sheet 10 is not engaged with the other registration roller at this stage.

As stated above, according to the present invention, since a single reversible motor is operative for driving the respective rotating elements in the printer, and the normal and reverse rotations of the motor are separately used for driving a pickup roller and other rotating elements, respectively, by the intervention of a one-way clutch in a transmission path, the printer has a simple structure and small size.

In addition, in the preferred embodiment, the printer housing is a clam type formed by an upper frame unit and a lower cover unit, which are detachably connected by a hinge. Rollers for running cut sheets are accommodated in the upper frame unit and a motor and a gear box are accommodated in the lower cover unit. Thus, when the upper frame unit is raised and separated from the lower cover unit, the connection between the rollers and the motor through the gear box is completely cut, so that the rollers can be easily rotated by hand when clearing a jam.

What is claimed is:

1. An image forming apparatus having a printing zone, comprising:

hopper means for holding a plurality of medium in cut sheet form;

a rotating image carrier;

a developer for forming a toner image on a surface of the image carrier;

a pickup roller for individually removing medium from the hopper;

a registration roller for introducing the medium removed by the pickup roller into the printing zone;

a fuser for fixing the toner image on the medium;

an eject roller for discharging the medium from the printing zone;

transport rollers for transporting the medium through the printing zone; and a motor selectively rotatable in a first, normal direction and a second, reverse direction according to commands output from a control unit for driving a plurality of rotating elements which include the rotating image carrier, the pickup roller, the fuser, the registration roller, the eject roller and the transport rollers, torque derived from said motor being transmitted to the pickup roller through a first transmission system incorporating a first one-way clutch, which transmits only one directional rotation of the motor, and to rotating elements other than the pickup roller through a second transmission system incorporating a second one-way clutch, which transmits only the opposite directional rotation of the motor.

2. An image forming apparatus according to claim 1, further comprising a gear box and a clam type housing accommodating said rotating image carrier, developer, pickup roller, registration roller, fuser eject roller, and motor and including a lower cover unit having a rear end portion and an upper frame unit hinged to the lower cover unit at the rear end portion thereof so that both units are detachably connected to each other, the motor, the image carrier, the developer, and the gear box relating to the motor and constituting a part of the first and second transmission systems being disposed in the lower cover unit, and the transport rollers being accommodated in the upper frame unit so that, when both units are detached from each other, the rollers in the upper frame unit are completely separated from the gear box and motor.

3. An image forming apparatus according to claim 1, wherein said hopper means comprises a plurality of hopers, each having a pickup roller and being connected to the first and second transmission systems through a magnetic clutch, any one of the plurality of hoppers being selectively driven by the first and second transmissions systems.

4. An image forming apparatus according to claim 1, further comprising a process cartridge which integrally incorporates the rotating image carrier with the developer, and a fuser unit which integrally incorporates the fuser with a cooling fan and the eject roller.

5. An image forming apparatus according to claim 2, wherein said hopper means comprises a plurality of hoppers, each having a pickup roller and being connected to the first and second transmission systems through a magnetic clutch, any one of the plurality of hoppers being selectively driven by the first and second transmission systems.

6. An image forming apparatus according to claim 2, further comprising a process cartridge which integrally incorporates the rotating image carrier with the developer, and a fuser unit which integrally incorporates the fuser with a cooling fan and the eject roller.

7. An image forming apparatus according to claim 3, further comprising a process cartridge which integrally incorporates the rotating image carrier with the developer, and a fuser unit which integrally incorporates the fuser with a cooling fan and the eject roller.

8. An image forming apparatus according to claim 5, further comprising a process cartridge which integrally incorporates the rotating image carrier with the developer, and a fuser unit which integrally incorporates the fuser with a cooling fan and the eject roller.

9. An image forming apparatus having a printing zone, comprising:

hopper means for holding a plurality of medium in cut sheet form;

a rotating image carrier;

a developer for forming a toner image on a surface of the image carrier;

a pickup roller for individually removing medium from the hopper;

a registration roller for introducing the medium removed by the pickup roller into the printing zone;

a fuser for fixing the toner image on the medium;

eject means for discharging the medium from the printing zone;

transport means for transporting the medium through the printing zone; and a motor selectively rotatable in a first, normal direction and a second, reverse direction according to commands output from a control unit for driving a plurality of rotating elements which include at least the rotating image carrier and the pickup roller, torque derived from said motor being transmitted to the pickup roller through a first transmission system incorporating a first one-way clutch, which transmits only one directional rotation of the motor, and to rotating elements other than the pickup roller through a second transmission system incorporating a second one-way clutch, which transmits only the opposite directional rotation of the motor.

10. An image forming apparatus according to claim 9, wherein said fuser comprises a heat roller and a backup roller, said rollers rotating by torque derived from said second transmission system and transmitted through a third one-way clutch.

* * * * *